United States Patent
Fee et al.

(10) Patent No.: US 10,176,002 B2
(45) Date of Patent: *Jan. 8, 2019

(54) QUIESCE HANDLING IN MULTITHREADED ENVIRONMENTS

(71) Applicant: International Business Machines Corporation, Armonk, NY (US)

(72) Inventors: Michael Fee, Cold Spring, NY (US); Ute Gaertner, Schoenaich (DE); Lisa C. Heller, Rhinebeck, NY (US); Thomas Koehler, Holzgerlingen (DE); Frank Lehnert, Schoenbuch (DE); Jennifer A. Navarro, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/573,025

(22) Filed: Dec. 17, 2014

(65) Prior Publication Data

US 2016/0139955 A1 May 19, 2016

Related U.S. Application Data

(63) Continuation of application No. 14/542,746, filed on Nov. 17, 2014.

(51) Int. Cl.
| | |
|---|---|
| *G06F 9/46* | (2006.01) |
| *G06F 9/455* | (2018.01) |
| *G06F 9/50* | (2006.01) |
| *G06F 9/48* | (2006.01) |

(52) U.S. Cl.
CPC ........ *G06F 9/45554* (2013.01); *G06F 9/4812* (2013.01); *G06F 9/5016* (2013.01); *G06F 9/5088* (2013.01); *G06F 9/45533* (2013.01); *G06F 2209/5018* (2013.01); *G06F 2209/5021* (2013.01)

(58) Field of Classification Search
CPC .. G06F 9/4881; G06F 9/45554; G06F 9/4818; G06F 9/5016; G06F 9/5088; G06F 9/45533; G06F 2009/5018; G06F 2009/5021
See application file for complete search history.

(56) References Cited

U.S. PATENT DOCUMENTS

| | | | |
|---|---|---|---|
| 6,675,192 B2 | 1/2004 | Emer et al. | |
| 7,379,418 B2 | 5/2008 | Korb et al. | |
| 8,032,716 B2 | 10/2011 | Heller et al. | |
| 8,140,834 B2 * | 3/2012 | Heller | G06F 9/4812 712/228 |

(Continued)

OTHER PUBLICATIONS

U.S. Appl. No. 14/542,746, entitled "Quiesce Handling in Multithreaded Environments", filed Nov. 17, 2014.

*Primary Examiner* — James J Lee
(74) *Attorney, Agent, or Firm* — Isaac J. Gooshaw

(57) ABSTRACT

Methods and apparatuses for performing a quiesce operation in a multithread environment is provided. A processor receives a first thread quiesce request from a first thread executing on the processor. A processor sends a first processor quiesce request to a system controller to initiate a quiesce operation. A processor performs one or more operations of the first thread based, at least in part, on receiving a response from the system controller.

4 Claims, 9 Drawing Sheets

(56) References Cited

U.S. PATENT DOCUMENTS

| | | |
|---|---|---|
| 8,407,701 B2 | 3/2013 | Gaertner et al. |
| 8,407,703 B1 | 3/2013 | Ault et al. |
| 8,751,775 B2 | 6/2014 | Greiner et al. |
| 2009/0037907 A1* | 2/2009 | Armstrong .......... G06F 12/1475 718/1 |
| 2012/0216195 A1* | 8/2012 | Heller ................ G06F 9/30087 718/1 |
| 2014/0025922 A1 | 1/2014 | Heller et al. |
| 2016/0117200 A1 | 4/2016 | Alexander et al. |

* cited by examiner

QUIESCE HANDLING IN MULTITHREADED ENVIRONMENTS

BACKGROUND OF THE INVENTION

The present invention relates generally to the field of performing a quiesce request for a computer system, and more particularly to performing the quiesce request in a multithreaded processing environment.

During a computing system's operation, a processor or processing core of the computing system may issue a quiesce request to halt or suspend operation of all other processors or cores of the computing system. A processor or core issues a quiesce request when an instruction requires access to one or more resources of the computing system, where the operation requires the resource to remain unchanged or unaltered during the execution of the operation. Many computing systems provide a multithreaded environment for programs or processes executing on the computing system. Multithreading allows multiple programs or processes to execute on the same core or processor of the computing system. A thread is a set of instructions or operations that an instance of a program or process requests to be performed by the computing system. Multithreading increases the utilization of the computing system and maximizes the utilization of a core or processor. If one thread executing on a core needs to wait, another thread can perform operations as the first thread waits.

SUMMARY

According to one embodiment of the present disclosure, a method for performing a quiesce operation in a multithread environment is provided. The method includes receiving, by a processor, a first thread quiesce request from a first thread executing on the processor. Sending, by the processor, a first processor quiesce request to a system controller to initiate a quiesce operation. Performing, by the processor, one or more operations of the first thread based, at least in part, on receiving a response from the system controller.

According to another embodiment of the present disclosure, a computer program product for performing a quiesce operation in a multithread environment is provided. The computer program product comprises a computer readable storage medium and program instructions stored on the computer readable storage medium. The program instructions include program instructions to receive, by a processor, a first thread quiesce request from a first thread executing on the processor. Program instructions to send, by the processor, a first processor quiesce request to a system controller to initiate a quiesce operation. Program instructions to perform, by the processor, one or more operations of the first thread based, at least in part, on receiving a response from the system controller.

According to another embodiment of the present disclosure, a computer system for performing a performing a quiesce operation in a multithread environment is provided. The computer system includes one or more computer processors, one or more computer readable storage media, and program instructions stored on the computer readable storage media for execution by at least one of the one or more processors. The program instructions include program instructions to receive, by a processor, a first thread quiesce request from a first thread executing on the processor. Program instructions to send, by the processor, a first processor quiesce request to a system controller to initiate a quiesce operation. Program instructions to perform, by the processor, one or more operations of the first thread based, at least in part, on receiving a response from the system controller.

DETAILED DESCRIPTION

Figure 1:
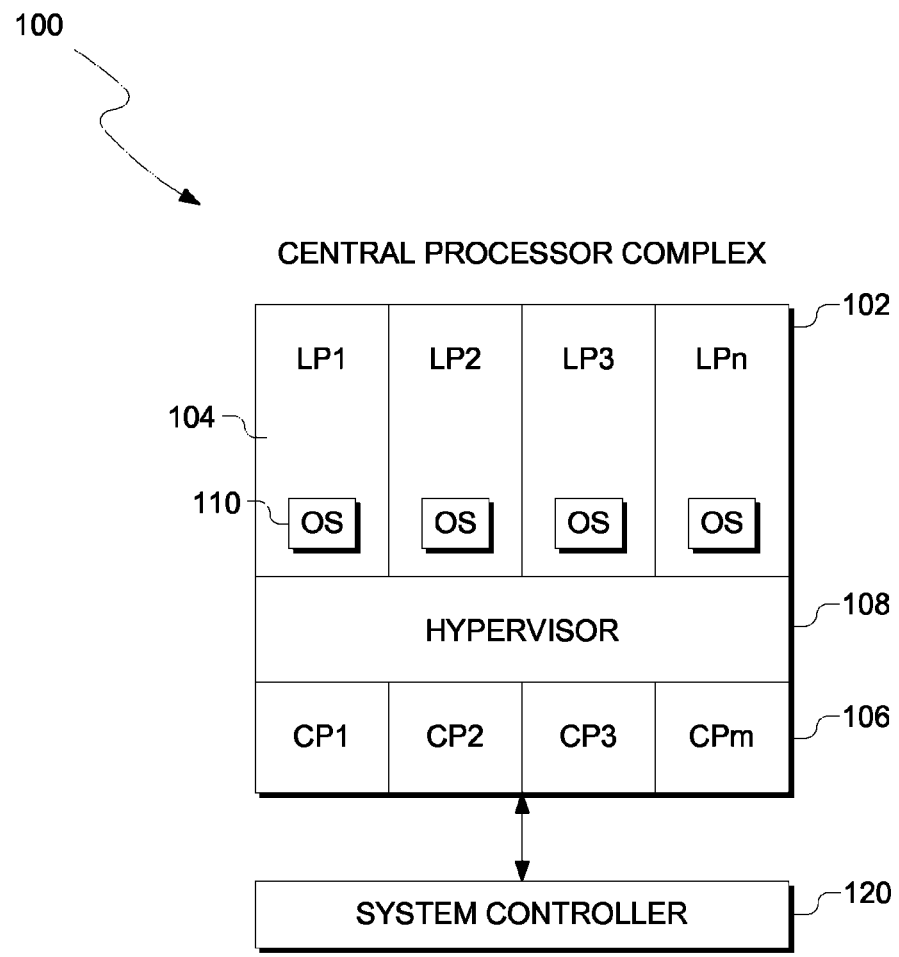
FIG. 1 depicts a computing environment, in accordance with an exemplary embodiment of the present invention.

A quiesce is the suspension of processing for a processor or processing cores of the processor. A computing system is quiesced when a group of processors or processing cores of the computing system are suspended. A processor or core sends a quiesce request to the computing system to suspend processing of the group of processors or processing cores of the computing system. A processor or core may send a quiesce request to the computing system to ensure a resource is not accessed or changed during a set of instructions or operations executed by said processor or core. A processor that sends a quiesce request is an initiating processor of the quiesce of the computing system. The computing system sends a quiesce command to the other processors based on receiving the request. The other non-initiating processors (e.g., processors that did not send a request to quiesce of the computing system) respond to the request and enter a quiesced state. The computing system keeps track of the quiesce status or state of the processors or cores during the quiesce of the system. Once the group of processors or cores respond and are quiesced, the computing system is quiesced. The computing system sends a command to the initiating processor to perform the instructions or operations that required the initial quiesce request. After the initiating processor performs said instructions or operations, the quiesce request is resolved and the computing system resumes operations for the group of processors or cores.

While solutions to processing quiesce requests are known, said solutions do not take into account the quiesce status of threads executing for a given core. Said solutions do not track the quiesce state of a thread and if said thread has a pending quiesce request for the computing system or a group of processors of the computing system. Embodiments of the present invention recognize that by providing a system level mechanism to maintain and monitor the status of one or more quiesce requests regarding the cores quiesce state an further providing mechanisms for each core to maintain and monitor the quiesce state for each thread executing on said core allows for proper maintaining of the quiesce state for individual threads executing in the multithreaded environment provided by the computing system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a computing environment 100, in accordance with an exemplary embodiment of the present invention. Computing environment 100 includes a central processor complex (CPC) 102 coupled to a system controller 120. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition 104 can be independently reset, initially loaded with an operating system 110, if desired, and operate with different programs. An operating system 110 or application program running in a logical partition 104 appears to have access to a full and complete system, but in reality, only a portion of it is available. A combination of hardware and Licensed Internal Code (commonly referred to as microcode or millicode) keeps a program in one logical partition from interfering with a program in a different logical partition. This allows several different logical partitions 104 to operate on a single or multiple physical processors in a time sliced manner. In this particular example, each logical partition 104 has a resident operating system 110, which may differ for one or more logical partitions 104.

Central processors 106 are physical processor resources that are allocated to the logical partitions 104. For instance, a logical partition 104 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors 106.

System controller 120, which is coupled to the central processor complex, includes centralized logic responsible for arbitrating between different processors issuing requests. For example, when system controller 120 receives a quiesce request, it determines that the requester is the initiating processor for that request and that the other processors are receiving processors; it broadcasts messages; and otherwise, handles requests. Further details are described with reference to FIGS. 3, 5A, 5B, 6A and 6B.

Figure 2:
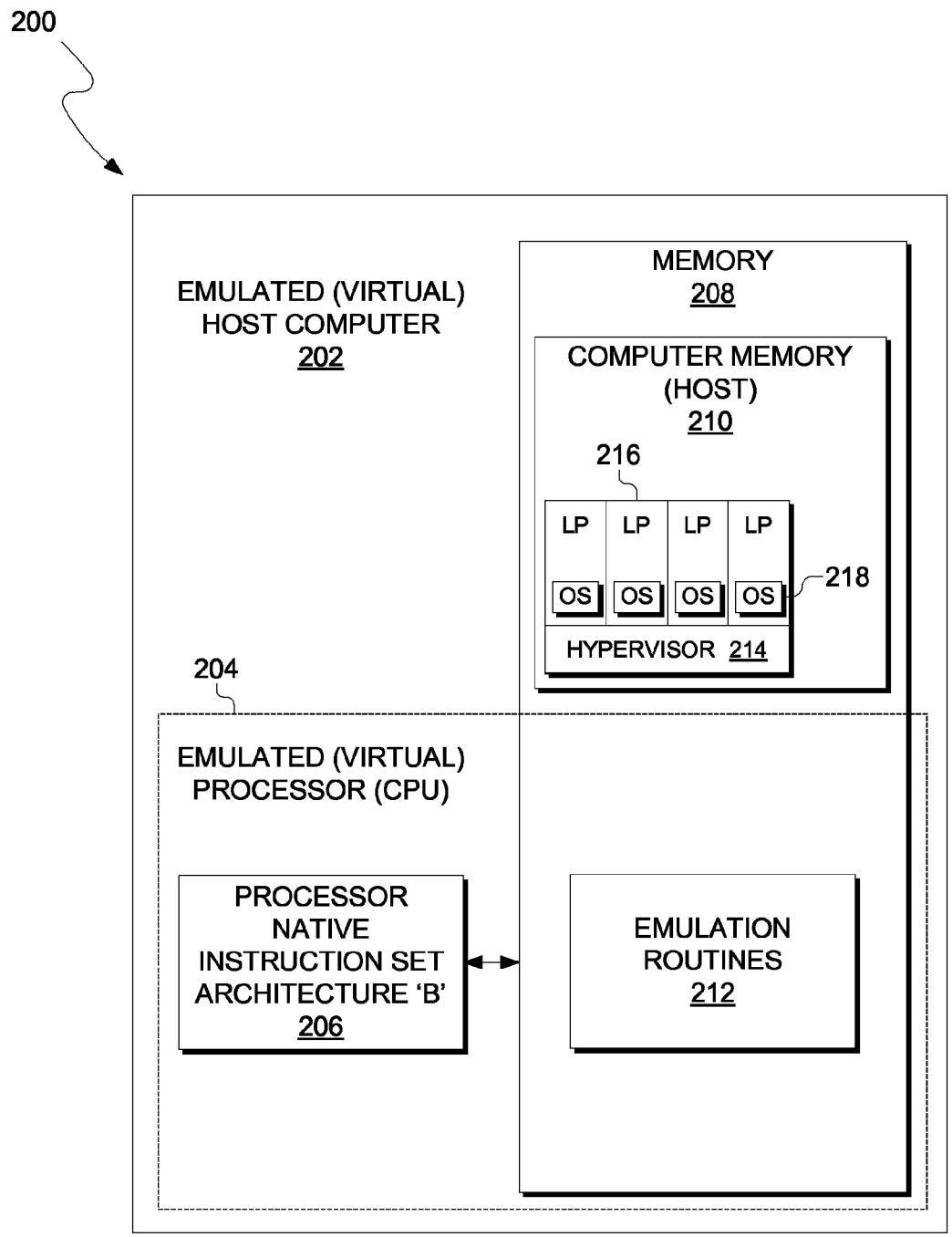
FIG. 2 depicts an emulated host computer system, in accordance with an exemplary embodiment of the present invention.

FIG. 2 depicts an emulated host computer system 200, in accordance with an exemplary embodiment of the present invention. Emulated host computer system 200 is provided that emulates a host computer system 202 of a host architecture. In emulated host computer system 200, a host processor (CPU) 204 is an emulated host processor (or virtual host processor) and includes an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 200 according to host computer architecture, and may include both a host or hypervisor 214 and one or more hypervisors 214 running logical partitions (LPs) 216 running operating systems 218, analogous to the like-named elements in FIG. 1. Emulation processor 206 executes native instructions of an architected instruction set of an architecture other than that of the emulated processor 204, the native instructions obtained from emulation routines memory 212, and may access a host instruction for execution from a program in host computer memory 210 by employing one or more instruction(s) obtained in a sequence and access/decode routine which may decode the host instruction(s) accessed to determine a native instruction execution routine for emulating the function of the host instruction accessed. One such host instruction may be, for example, processor quiesce request initiated by a processing core, by which the host recovers information of an emulated processor 204. The emulation routines 212 may include support for this instruction, and for executing a sequence of guest instructions in accordance with the definition of the quiesce request.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 204 (such as general registers and dynamic translation of virtual addresses) to improve performance of the emulation routines. Special hardware and offload engines may also be provided to assist processor 206 in emulating the function of host computer 202.

Figure 3:
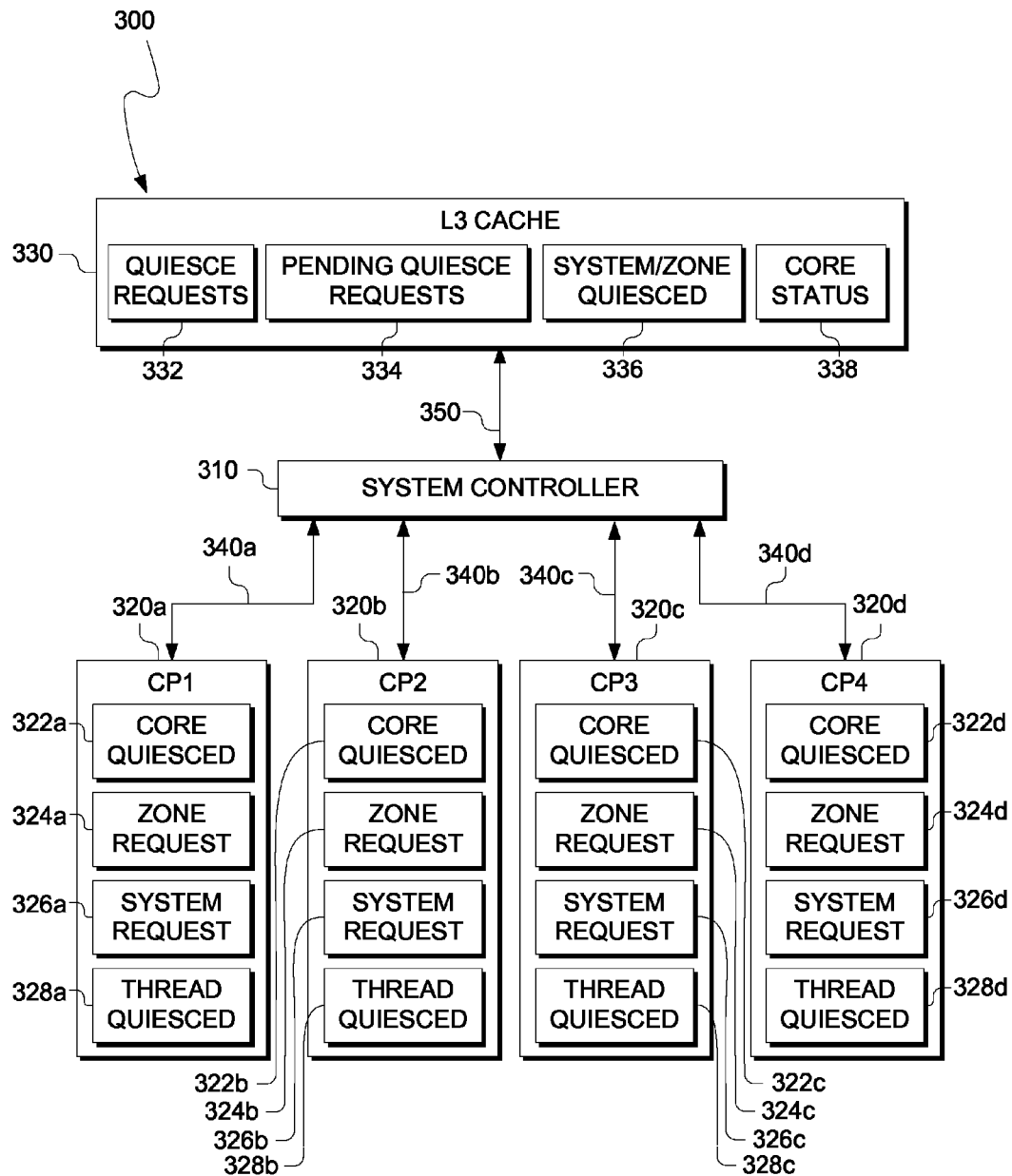
FIG. 3 depicts one embodiment of further details associated with a system controller and one or more processors of FIG. 1, in accordance with an exemplary embodiment of the present invention.

FIG. 3 depicts an example computing system, 300, of a system controller 310 coupled to processors 320a-d. In this example, four processors are depicted. However, in other embodiments, any number of processors may be coupled to system controller 310. Each processor 320a-d includes core quiesced 322a-d, zone request 324a-d, system request 326a-d and thread quiesced 328a-d data describing the quiesce status of each respective processor 320a-d and one or more threads executing on said processors 320a-d. Each processor 320a-d is connected to system controller 310 via interface 340a-d. System controller 310 is coupled to L3 cache 330 via interface 350. L3 cache 330 includes quiesce requests 332, pending quiesce requests 334, system/zone quiesced 336, and core status 338.

In various embodiments, a processor of processors 320a-d executes an instruction, operations, series of instructions or series of operations for one or more threads executing on the processor. In some cases, one or more threads require a quiesce of all processors 320a-d (e.g. system quiesce) or a subset of processors 320a-d (e.g. zone quiesce) for the execution of the instructions or operations. Based on the type of quiesce request (e.g., zone or system quiesce) initiated by the thread, the processor of processors 320a-d executing the thread sets a respective bit value for zone request 324 or system request 326. Both zone request 324 and system request 326 are a predetermined number of bits wide equal to the number of threads the processor is capable of executing. For example, zone request 324 and system request 326 are "4" bits in size given the processor is capable of executing four threads. One of ordinary skill in the art will recognize that the respective size of zone requests 324a-d and system requests 326a-d can be any number of bits based on the design of respective processors 320a-d. For example, processor 320a is designed to execute four threads and zone request 324a and system request 326a are four bits wide. Processor 320b is designed to execute eight threads and zone request 324a and system request 326a are eight bits wide.

When a thread issues a quiesce request, the respective processor of processors 320a-d, executing said thread, sets a bit for either zone request 324*a-d* and system request 326*a-d* for the respective processor. If the thread issues a quiesce request for a zone, then the respective processor 320 sets a corresponding bit to the thread in zone request 324. For example, processor 320*a* executes two threads designated TH0 and TH1. Zone request 324*a* is two bits wide for each thread. TH1 issues a zone quiesce request. Processor 320*a* sets the second bit of zone request 324*a*, resulting in zone requests 324*a* to being "01" (assuming TH0 has not previously issued a quiesce request that has yet to be resolved by computing system 300). In some embodiments, a zone is predefined in the design of computing system 300. For example, processors 320*a* and 320*c* are part of a first zone and processors 320*b* and 320*d* are part of a second zone. Given that a thread executing on processor 320*a* initiates a quiesce request, then processor 320*c* will be part of the quiesce operation of computing system 300. As such, processors 320*b* and 320*d* will continue operation while the processors of the first zone (e.g. 320*a* and 320*c*) perform the quiesce operation. In other embodiments, the thread issues a zone quiesce request which includes a group of processors that need to be quiesced. For example, a thread executing on processor 320*b* issues a zone quiesce for processors 320*c* and 320 *d*. Processors 320*b-d* proceed with resolving the quiesce request while processor 320*a* continues normal operation. Regarding a system quiesce request from a thread, the respective processor 320 sets the corresponding bit for the thread of system request 326. As with zone request 324 discussed above, system request 326 has a corresponding bit for the number of threads processor 320 is designed to execute. However, system request 326 stores any initiating request from a thread requesting that computing system 300 be quiesced.

In various embodiments, thread quiesced 328*a-d* stores the quiesced status of each thread executing on a respective processor of processors 320*a-d*. When a thread initiates a quiesce request, either zone or system, the thread enters a quiesced state. The respective processor 320 sets the thread quiesced 328 bit for the initiating thread. As with both zone request 324 and system request 326, thread quiesced 328 is a predetermined number of bits wide corresponding to the number of threads processor 320 is designed to execute. Non-initiating threads (e.g., threads which do not have a pending quiesce request) respond to a quiesce request received from system controller 310. Upon receiving a quiesce request, a non-initiating thread will continue operation until the thread reaches an interruptible point in the operations or instructions said thread is currently performing. Upon reaching an interruptible point, the non-initiating thread responds to the quiesce request. Based upon receiving the response, processor 320 sets the corresponding bit in thread quiesced 328. Once all threads of processor 320 have responded to a quiesce request (e.g., all bits of thread quiesced 328 are set), then processor 320 sets core quiesced 322 to indicate that the processor is quiesced. In some embodiments, core quiesced 322 is determined by processor 320 by performing a logical AND operation to the bits of thread quiesced 328.

In various embodiments, processor 320 determines if a pending quiesce request is present for one or more threads executing on said processor 320. Processor 320 determines if a pending quiesce request is present for the threads executing on said processor 320 by performing a bitwise OR operation for both zone request 324 and system request 326. Based on the determination, processor 320 sends a set quiesce request to system controller 310. The set quiesce request includes an identifier of the processor (e.g., 1, 2, 3 or 4 in a binary equivalent) to determine which processor that made the request. In embodiment with threads that have pending zone requests 324, processor 320 sends a zone quiesce request to system controller. In embodiments with threads that have pending system requests 326, processors sends a system quiesce request to system controller 310. A thread issues a quiesce request when said thread needs to perform an operation which will access and modify a resource of the system. During this operation the thread requires no other processor or threads executing on the processors access or modify said resource. Prior to execution of the operation, processor 320*a* sends a set quiesce request to system controller 310. A processor that sends a set quiesce request to system controller 310 is referred to as the initiating processor or initiator.

In various embodiments, system controller 310 includes various controls to receive and process incoming set quiesce requests from processors 320*a-d* via interfaces 340*a-d*. For example, one or more processor of processors 320*a-d* sends a set quiesce request to system controller 310 based on the processor determining a thread has initiated a quiesce request. System controller 310 determines the initiating processor of the request and updates the quiesce status information stored in L3 cache 330 (i.e., quiesce requests 332, pending quiesce requests 334, system/zone quiesced 336 and core status 338) via interface 350.

In various embodiments, system controller 310 sends a quiesce interrupt operation to processors 320*a-d* in response to receiving and processing a quiesce request from an initiating processor. For zone quiesce request, system controller 310 sends a quiesce interrupt operation to the respective processors 320*a-d* of the zone. For a system quiesce request, system controller 310 sends a quiesce interrupt operation to all processor 320*a-d*. Each processor of processor 320*a-d* receiving a quiesce interrupt operation and will continue operation until each thread executing on the respective processor of processors 320*a-d* is at an interruptible point of execution. Once a thread executing on processor of processors 320*a-d* reaches an interruptible point, the processor sets the corresponding bit of thread quiesced 328. Once all threads have responded and core quiesced 322 is set, the respective processor 320 sends a quiesce interrupt response to system controller 310. The responding processor includes in the quiesce interrupt response an identifier representative of the responding processor of processors 320*a-d*. In response to receiving a quiesce response, system controller 310 updates quiesce status information stored in L3 cache 330 to reflect the respective processors quiesced state.

In various embodiments, system controller 310 receives responses, including the initiating processors and all other processors (e.g., non-initiating processors) (from either the respective zone of processors 320*a-d* for zone quiesce request of all processors 320*a-d* for system quiesce requests), and determines if computing system 300 or a zone of computing system 300 is quiesced, setting the system/zone quiesced 336 status to '1'. System controller 310 updates the quiesce status information stored in L3 cache 330 to indicate that computing system 300 or a zone of computing system 300 is in a quiesced state (e.g., each processor 320*a-d* of the system or zone is suspended from operation) via system/zone quiesced 336.

Based on the determination that computing system or respective zone is in a quiesced state, system controller 310 determines the priority of one or more initiating processors 320*a-d*. System controller 310 sends an operation to the initiating processor with the highest priority to perform the instruction or operation that required the set quiesce request to be sent. The respective processor of processors 320*a-d* receiving the operation determines a priority for the threads with pending requests executing on the respective processor of processors 320*a-d* based on zone request 324*a-d* and/or system request 326*a-d* of the respective processor. The processor sends an operation to the highest priority thread with a pending quiesce request to perform the operations requiring the quiesce request. The processor continues for each thread until all pending threads for the processor have resolved their respective quiesce request. Once all threads with pending quiesce requests resolve the quiesce requests, the initiating processor sends a reset quiesce operation to system controller 310. System controller 310 updates quiesce status information stored in L3 cache 330.

In various embodiments, L3 cache 330 includes quiesce status information describing the pending quiesce requests, the priority of the pending quiesce requests, the quiesce status of computing system 300 and the quiesce status of processors 320*a-d*. Quiesce requests 332 status information includes an indication of each processor of processors 320*a-d* which initiated a quiesce request. In an embodiment, L3 cache 330 has a separate controller (not shown) and is connected via separate interfaces (not shown) to processors 320*a-d*. In some embodiments, all or some portion of L3 cache 330 is error-correcting code (ECC) protected. For example, if a parity check determines an error is detected in the data stored in L3 cache 330 then the ECC protection can correct the error thereby ensuring the correctness of the data stored in L3 cache 330. In some embodiments, quiesce requests 332 is stored in L3 cache as a vector. The vector includes one bit sized elements is has a dimension equal to the number of processors in computing system 300. Each element corresponds to a processor and is set when system controller 310 receives a set quiesce request from a corresponding processor. For example, receipt of a quiesce request from processor 320*a* is stored in the first position of the vector, a request from processor 320*b* in the second position, a request from processor 320*c* in the third portion and a request from processor 320*d* in the fourth position of the vector. Quiesce requests 332 accumulates all received set quiesce requests until the system is quiesced. For example, processor 320*a* sends a set quiesce request to system controller 310 with an identifier (e.g., "00") of the processor. System controller 310 sets the corresponding bit of the vector to one for the bit assigned to processor 320*a* (e.g., the priority vector equals "1000"). During the process of quiescing computing system 300, system controller 310 receives another quiesce request from processor 320*c*, with identifier "10". System controller 310 sets the corresponding bit of the vector reflecting all received quiesced requests (e.g., "1010"). In another embodiment, quiesce requests 332 is stored as a stack. For example, the identifier of an initiating processor of processors 320*a-d* is stored in a memory location of L3 cache 330 as indicated by a pointer address. With each received request, system controller 310 increments the pointer to the next memory address of the stack. Using the example where processor 320*a* sends a quiesce request followed by processor 320*c*, the stack would have two identifiers starting with '00' and ending with '10' and a length of two.

In various embodiments, system controller 310 sends commands or operations to initiating processors 320*a-d* to perform the operations or instructions that required the system to be quiesced. Each initiating processor resolves the priority of the initiating threads which initiated the quiesce requests, which in turn said threads resolve the quiesce requests. System controller 310 determines a priority of the quiesce requests for initiating processors with pending quiesce requests for threads executing on said processors. System controller 310 sends commands to the initiating processors in an order based on the determined priority. In embodiments where a vector is used to store the quiesce priority, system controller 310 sends commands to perform the operations requiring the quiesce request to the left most bit of the vector that is set. For example, if the vector is '0101' then system controller 310 will first send commands to processor 320*b* to perform the operations requiring the quiesce request. Once system controller 310 receives a response from processor 320*b* indicating the operations requiring the quiesce request have been performed, system controller 310 then sends a second command to processor 320*d* to perform the operations requiring the quiesce request. As another example, system controller 310 determines priority based on the right most bit of the vector that is equal to one. For embodiments where quiesce requests 332 is stored as a stack, system controller 310 performs a "pop" operation of the stack to retrieve an identifier to determine the processor which the command is sent to. For example, the stack is implemented as First-In-First-Out stack (FIFO). The processor that sent the first request received by system controller 310 is given priority. System controller 310 removes the identifier from the stack and 'pushes' any remaining requests to the top of the stack, thereby allowing processors 320*a-d* to perform the operations requiring the quiesce state to be executed in order as received by system controller 310.

In various embodiments, after a processor of processors 320*a-d* resolve pending quiesce requests for threads executing on said processor, the respective processor sends a reset operation to system controller 310. In embodiments where quiesce requests 332 is a vector, system controller 310 sets the corresponding bit of the vector to zero when it receives a resets operation from the respective processor of processors 320*a-d*. In embodiments where quiesce requests 332 is a stack, system controller 310 removes the identifier from the stack and "pushes" any remaining requests to the top of the stack. In various embodiments, the initiating processor sets the zone request 324 or system request 326 status for the respective initiating processor, indicating the quiesce request was acknowledged and completed for that processor. Once all pending quiesce requests are resolved, system controller 310 resets the status of the system/zone's quiesce state (system/zone quiesced 336) and processors 320*a-d* resume operation.

In various embodiments, pending quiesce requests 334 status information is a status bit that indicates if any pending quiesce requests are present for at least one processor 320. In embodiments where quiesce requests 332 is a vector, pending quiesce requests 334 is determined by performing an OR operation across all bits of the vector. If a pending request is stored in the vector, then pending quiesce requests 334 will be set to "1". In embodiments where quiesce requests 332 is a stack, the length of the stack is determined. If the stack is a length greater than zero then pending quiesce requests 334 will be set to "1". In some embodiments, system/zone quiesced 336 status information indicates if all processors 320*a-d*, including initiating processors and non-initiating processors, are quiesced. In other embodiments, quiesce requests 332 is partitioned into parts for each zone of computing system 300. For example, two zones are designed for computing system 300 one for processors 320*a-b* and another zone for processors 320*c-d*. Quiesce request 332 has two corresponding bits for the first zone and two corresponding bits for the second zone. Once all non-initiating processors of computing system 300 or a subset of processors of computing system 300 (i.e., for zone quiesce request) have responded to quiesce interrupt command, system controller 310 sets the system/zone quiesced 336 status to "1". For example, system controller 310 sets system/zone quiesced 336 when all processors 320a-d have set their respective core quiesced 320a-d bits. In embodiment where a zone quiesce request is performed, system/zone quiesced 336 has a bit to store the quiesce status of each zone of computing system 300. In various embodiments, core status 338 stores the quiesce status of all processors 320a-d, equivalent to the respective core quiesced 320a-d status of the respective processors.

Figure 4:
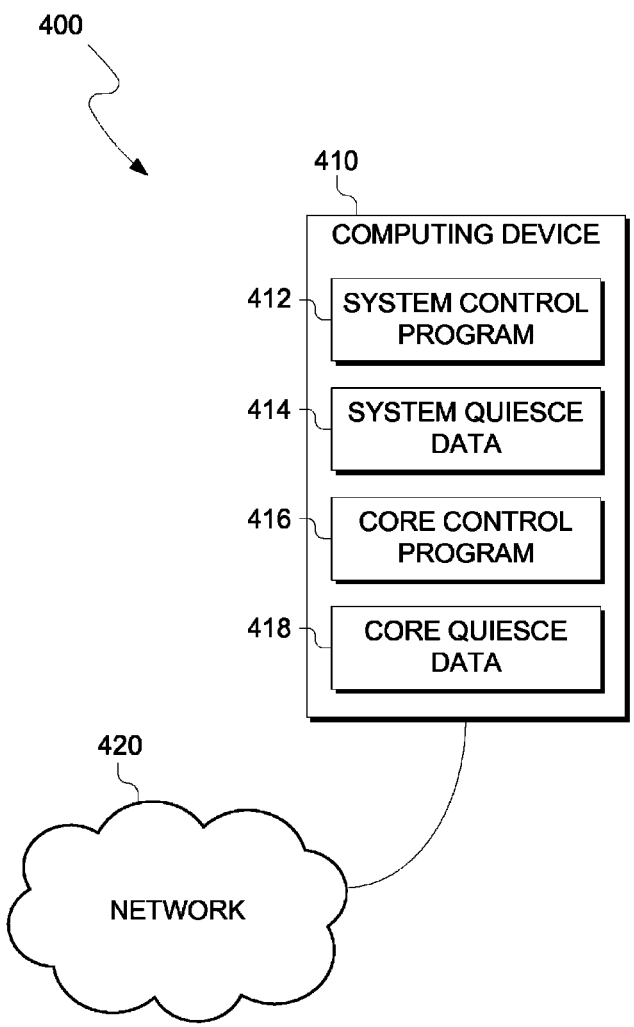
FIG. 4 depicts further details associated with an emulated computing environment of FIG. 2, in accordance with an exemplary embodiment of the present invention.

FIG. 4 is a functional block diagram illustrating an emulated computing environment, generally designated 400, in accordance with an exemplary embodiment of the present invention. Emulated computing environment 400 includes computing device 410 connected over network 420. Computing device 410 includes system control program 412, system quiesce data 414, core control program 416 and core quiesce data 418.

In various embodiments of the present invention, computing device 410 is a computing device that can be a standalone device, a server, a laptop computer, a tablet computer, a netbook computer, a personal computer (PC), or a desktop computer. In another embodiment, computing device 410 represents a computing system utilizing clustered computers and components to act as a single pool of seamless resources. In general, computing device 410 can be any computing device or a combination of devices with access to system quiesce data 414 and core quiesce data 418 and is capable of executing system control program 412 and core control program 416. Computing device 410 may include internal and external hardware components, as depicted and described in further detail with respect to FIG. 8.

In this exemplary embodiment, system control program 412, system quiesce data 414, core control program 416 and core quiesce data 418 are stored on computing device 410. However, in other embodiments, system control program 412, system quiesce data 414, core control program 416 and core quiesce data 418 may be stored externally and accessed through a communication network, such as network 420. Network 420 can be, for example, a local area network (LAN), a wide area network (WAN) such as the Internet, or a combination of the two, and may include wired, wireless, fiber optic or any other connection known in the art. In general, network 420 can be any combination of connections and protocols that will support communications between computing device 410 and other devices (not shown) of network 420, in accordance with a desired embodiment of the present invention.

In exemplary embodiments, system control program 412 provides emulation routines 212 to perform emulated operations of system controller 310. Core control program 416 provides emulation routines 212 to perform emulated operation of one or more processors 320a-d. System quiesce data 414 stores status information of the system quiesce status. Core quiesce data 418 stores status information of one or more processors quiesce status.

In various embodiments, system control program 412 receives set and reset quiesce requests from one or more instances of core control program 416. System control program 412 updates system quiesce data based on received set and reset quiesce requests. System control program 412 sends and receives quiesce response operations to one or more instances of core control program 416. System control program 412 updates system quiesce data based on received quiesce responses.

In various embodiments, core control program 416 performs program instructions and operations for one or more emulated programs of emulated host computer 200. The emulated programs include one or more threads containing instructions or operations for the emulated program. Core control program 416 sends set and reset quiesce requests from one or more emulated programs to system control program 412. Core control program 416 sends and receives quiesce responses from one or more emulated programs to system control program 412 and the respective threads of the one or more emulated programs. Core control program 416 handles quiesce requests for one or more threads. Core control program 416 determines a priority of the threads with pending quiesce requests.

In various embodiments, system quiesce data 414 stores various status information for the quiesced state of emulated host computer 200. For example, system quiesce data 414 stores information for received quiesce requests, pending quiesce request, the emulated host computers quiesced state, and the quiesced state of one or more emulated processors 204. Core quiesce data 418 stores various status information for one or more emulated processors 204. For example, core quiesce data 418 stores information about the quiesced state of a emulated processor 204, pending zone quiesce requests for one or more threads of one or more emulated programs, pending system quiesce requests for one or more threads of one or more emulated programs, and the quiesced status of the one or more threads of one or more emulated programs.

Figure 5A:
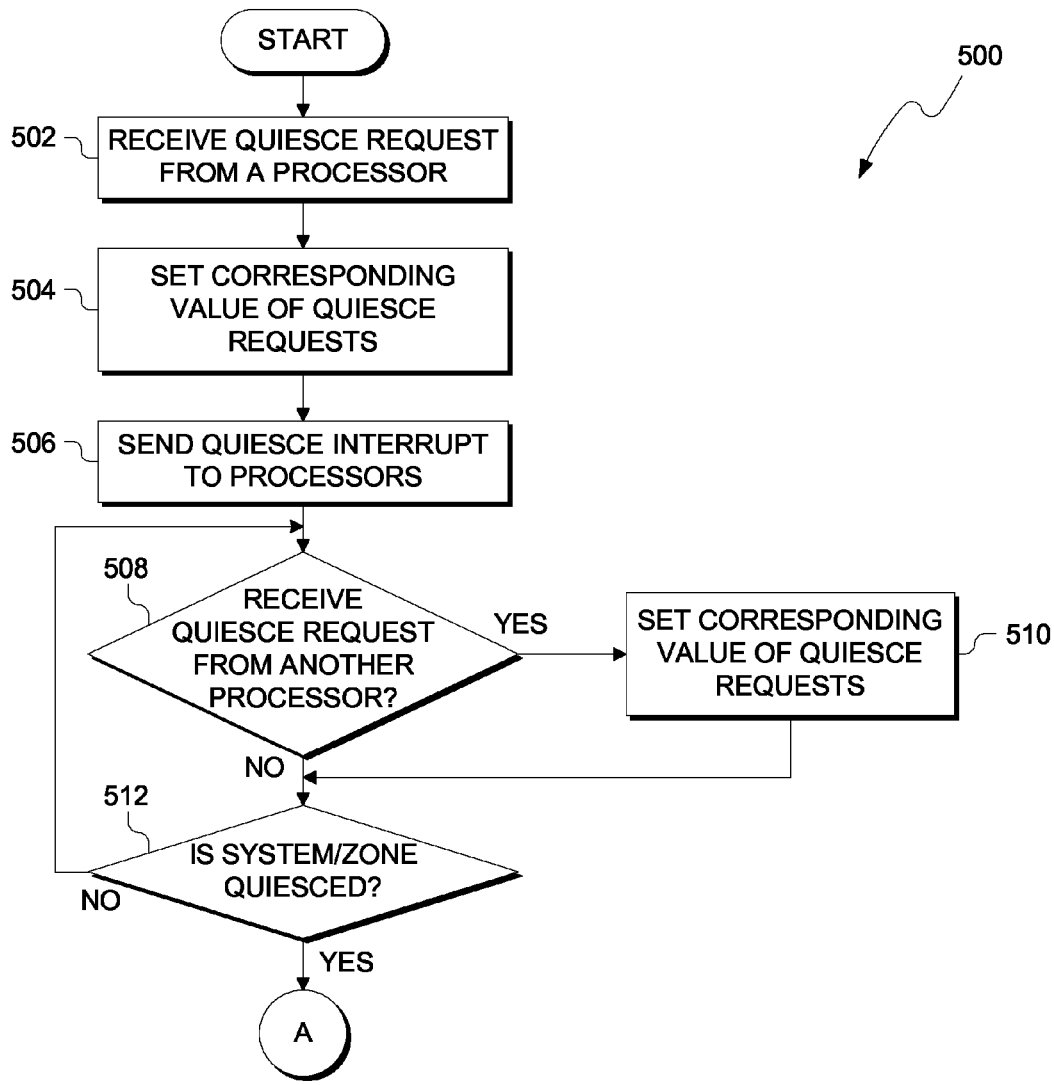
FIGS. 5A & 5B depicts quiesce request processing at the system controller of a multithreaded computing system of FIG. 3, in accordance with an exemplary embodiment of the present invention.
Figure 5B:
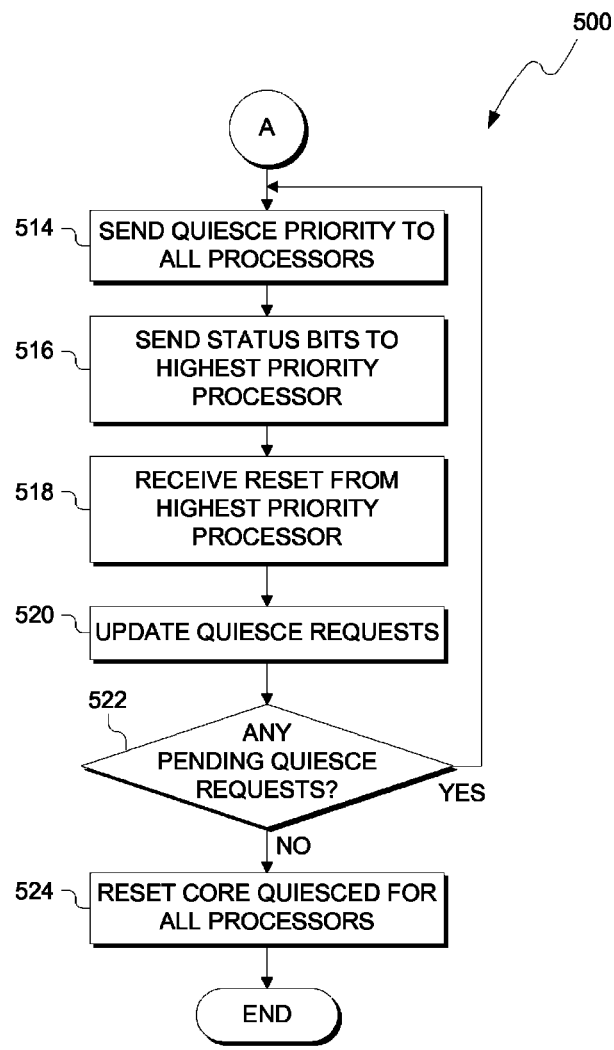

FIGS. 5A & 5B depicts a process, 500, of system controller 310 receiving quiesce requests and quiescing computing system 300, in accordance with an exemplary embodiment of the present invention. In process 502, system controller 310 receives a quiesce request from a processor core of processors 320a-d. The request includes an instruction to set quiesce requests 332 for the initiating processor in addition to an identifier for said initiating processor. In response to receiving a quiesce request, system controller 310 sets the corresponding value associated with the initiating processor, as indicated by the identifier of the request, to indicate that a quiesce request was received and is pending in computing system 300 (process 504). For example, quiesce requests 332 is stored as a vector. The vector has a bit value for each processor 320a-d of computing system 300. System controller 310 sets the corresponding bit value associated with a processor in the vector when a quiesce request is received.

In process 506, system controller 310 sends a quiesce interrupt command to a set of processors of computing system 300 for zone quiesce requests or all processing cores of computing system 300 for system quiesce requests. During process 506 and until the system or zone is quiesced (process 512), system controller 310 may receive other quiesce requests from another processor of processors 320a-d than the initial initiating processors (i.e., the processor that sent the request in process 502). In process 508, system controller 310 determines if any new requests have been received. If a quiesce request is received by system controller 310 (YES branch of process 508), then system controller 310 will update quiesce requests 332 to indicate quiesce request was received and is pending in computing system 300 (process 510). If no quiesce requests are received by system controller 310 (NO branch of process 508), then system controller 310 determines if computing system 310 is quiesced.

In process 512, system controller 310 determines if computing system 300 or a zone of computing system 300 is quiesced. Computing system 300 is quiesced when all processors 320a-d have reached an interruptible point in execution of a current thread or set of instructions. A zone of computing system 300 is quiesced when all processors 320a-d of the zone have reached an interruptible point in execution of a current thread or set of instructions. Processors 320a-d respond to the quiesce interrupt command sent in process 506 by sending a quiesce interrupt response to system controller 310. The quiesce interrupt response includes an identifier of the responding processor 320a-d. System controller 310 receives the quiesce interrupt responses from processors 320a-d. System controller 310 sets system/zone quiesced 336 status information in L3 cache when all processors or all processors of the corresponding zone have sent a response. If computing system 300 is not quiesced and one or more processors 320a-d have not responded to the quiesce interrupt command sent in process 508 (NO branch of process 512), then system controller 310 waits for the quiesce interrupt responses to be received from all processors 320a-d (process 512). System controller 310 may receive and process any quiesce requests (processes 508 and 510) until all processors 320a-d have responded to the quiesce interrupt command. If computing system 300 is quiesced (YES branch of process 512), the system controller 310 will proceed with processing the pending quiesce requests for the one or more processors 320a-d received in processes 502 and 508.

In process 514, system controller 310 sends the quiesce priority to all processing cores of processors 320a-d. System controller 310 sends the vector stored in quiesce requests 332. The processor associated with the left most position of the vector which is set (i.e., equal to '1') is given priority to perform the operations or instructions which required the quiesce request to be originally sent (e.g., processes 502 and 508). In other embodiments, system controller 310 sends a command with the identifier of the highest priority processor to all processors 320a-d. In some embodiments, system controller 310 sends additional status information stored in L3 cache 330 (process 516).

In process 518, the processor of processors 320a-d with the highest priority performs the operations that required the quiesce request to be sent. The processor sends a reset quiesce request to system controller 310 including an identifier of the processor. System controller 310 receives the reset quiesce request for the processor, and based on the identifier, updates the corresponding value of quiesce requests 332 by resetting the corresponding value to '0' (process 520). System controller 310 determines if any pending quiesce requests are present (process 522). System controller 310 evaluates pending quiesce requests 334. If pending quiesce requests 334 indicates that additional quiesce requests are pending (YES branch of process 522), then system controller 310 sends the updated quiesce requests 332 to all processors 320a-d. System controller 310 continues the above processes 514-522 until all pending quiesce requests 334 are resolved by the initiating processors. If pending quiesce requests 334 indicates that no quiesce request are pending (NO branch of process 522), system controller 310 sends a reset core quiesced command to all processors 320a-d (process 524). Processors 320a-d reset the respective core quiesced 320a-d status and thread quiesced 328a-d information. System controller resets system/zone quiesced 336 status information stored in L3 cache 330.

Figure 6A:
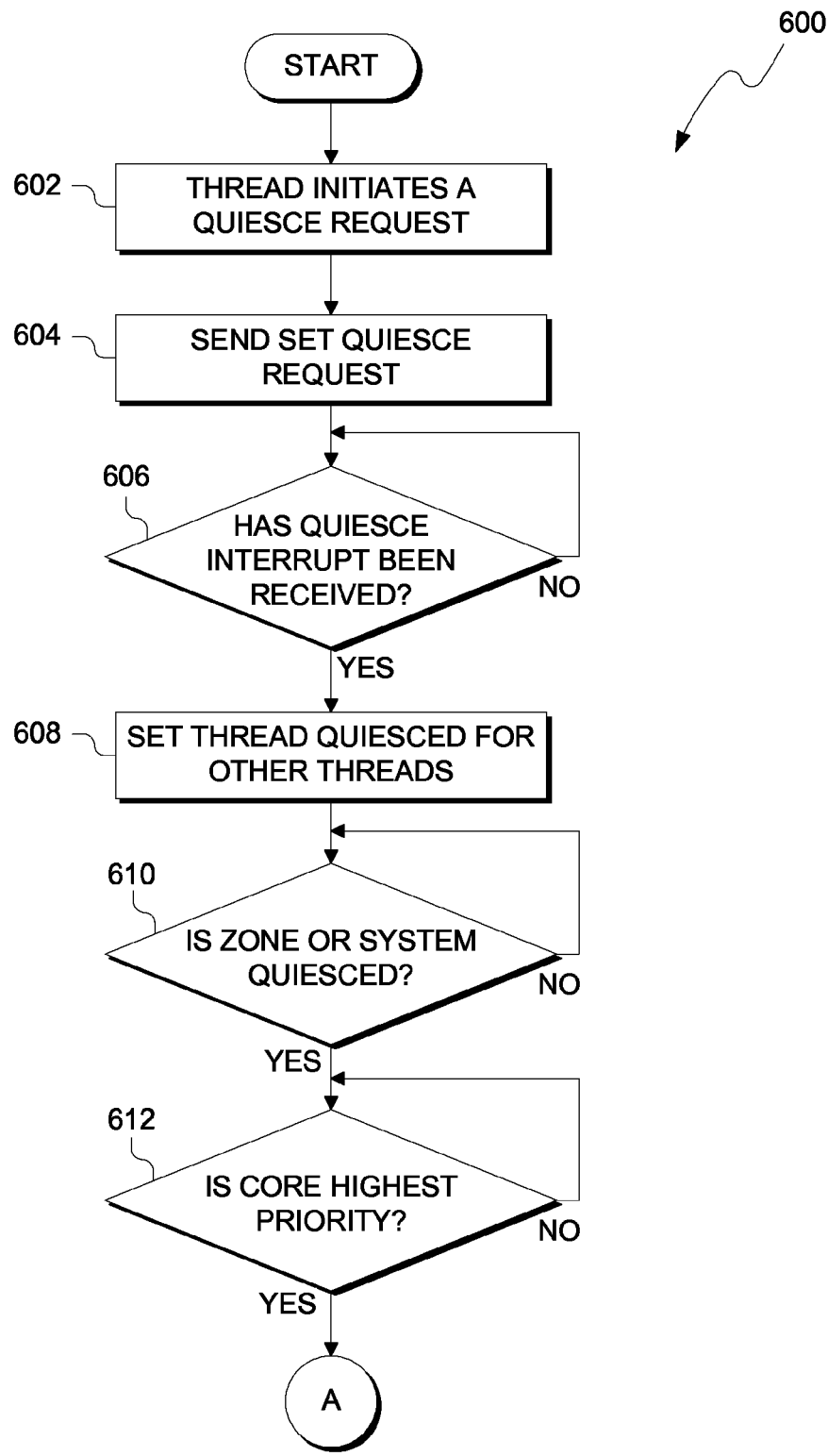
FIGS. 6A & 6B depicts quiesce interrupt processing at a processor of a multithreaded computing system of FIG. 3, in accordance with an exemplary embodiment of the present invention.
Figure 6B:
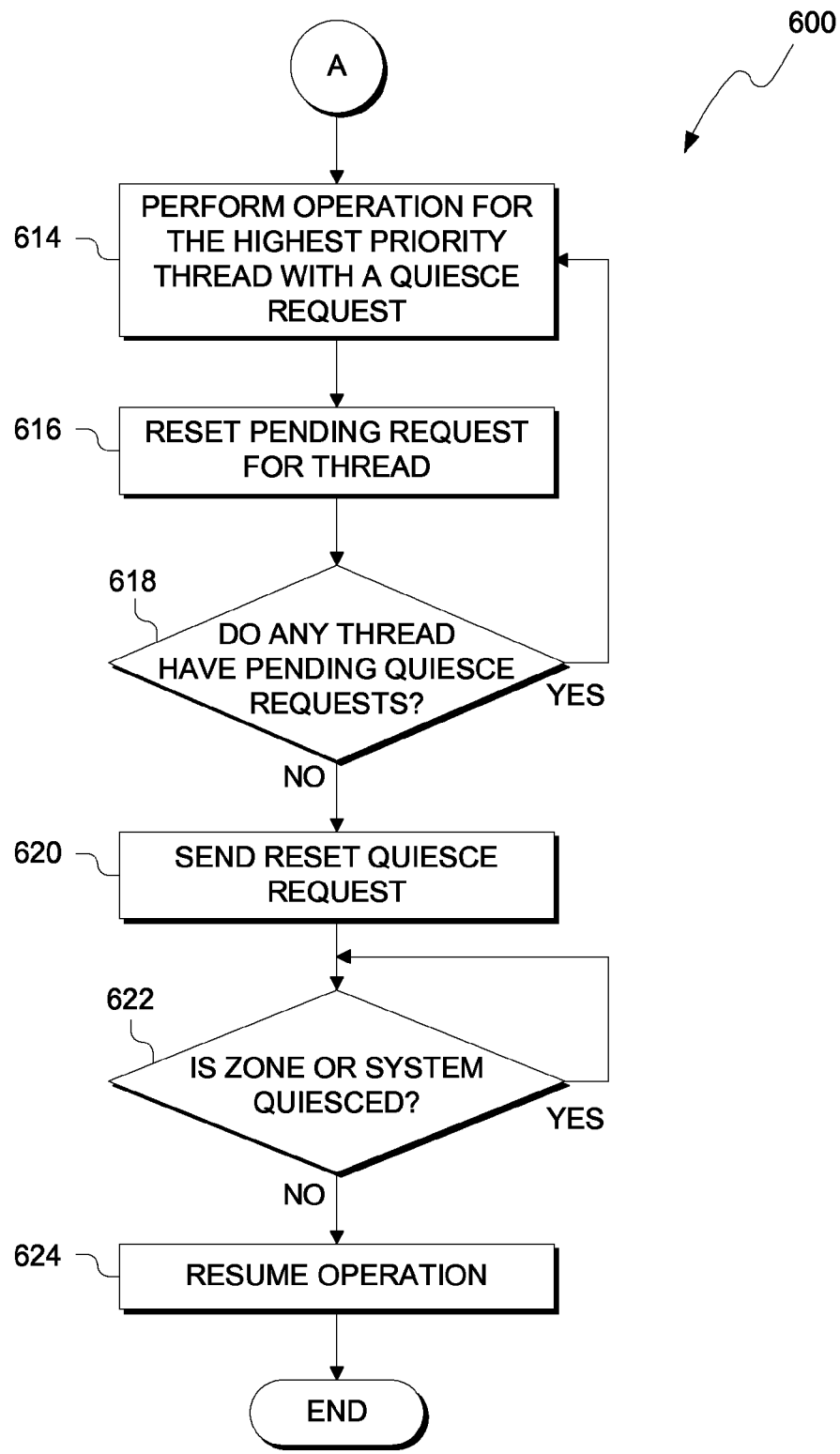

FIGS. 6A & 6B depicts a process, 600, of a processor 320 handling quiesce interrupt processing at a processor of a multithreaded computing system 300. In process 602, a thread executing on a processor 320 initiates a quiesce request. The thread sends the request to processor 320 and is referred to as the initiating thread. Based on the type of request (e.g., zone or system quiesce), processor 320 sets a corresponding bit of the respective zone request 324 or system request 326. The thread sending the quiesce request to processor 320 enters a quiesce state and processor 320 sets the corresponding bit in thread quiesced 328 for the thread. For example, processor 320 executes four threads (TH0, TH1, TH2 and TH3). TH3 sends a system quiesce request to processor 320. Processor 320 sets the corresponding bit of system request 326 (e.g., system request 326 is equal to "0010" assuming no other threads have pending system quiesce requests). Processor 320 sets the corresponding bit of thread quiesced 328 since the initiating thread has entered a quiesced state.

In process 604, processor 320 sends a set quiesce request to system controller 310 based on the received quiesce request from the thread (e.g., a zone or system quiesce request). Until all pending quiesce requests are resolved, processor 320 may receive additional quiesce requests from other threads (process 602). In some embodiments, processor 320 receives a first zone quiesce request from a first thread and a then receives a second zone quiesce request from a second thread. In such embodiments, processor 320 sets the corresponding zone request 324 bit for the second thread, but does not send an additional set zone quiesce request to system controller 310 as a zone quiesce request is pending for processor 320. In other embodiments, processor 320 receives a first zone quiesce request from a first thread and a then receives a second system quiesce request from a second thread. In such embodiments, processor 320 sets the corresponding system request 324 bit for the second thread, however also sends a set system quiesce request to system controller 310 since the system quiesce request requires additional processors to be quiesced. As such system controller 310 will need to send out a system quiesce command to supersede the zone quiesce request in response to the first thread.

In process 606, processor 320 waits to receive a quiesce interrupt command from system controller 310. If a quiesce interrupt command has not been received (NO branch of process 606), then processor 320 continues operation for all threads that are not quiesced. If a quiesce interrupt command has been received (YES branch of process 606), then processor 320 waits for all threads executing on processor 320 to reach an interruptible point in execution. Once all threads of processor 320 reach an interruptible point, the threads are quiesced and processor 320 sets the bits for each quiesced thread in thread quiesced 328 (process 608). In process 608, when a thread reaches an interruptible point in execution, the thread sends a a quiesce response to processor 320. Processor 320 set the corresponding bit of thread quiesced 328 for the thread. When all threads are quiesced then processor 320 is quiesced. In response to all threads being quiesced, processor 320 sets core quiesced 322 indicating that processor is quiesced and is in a suspended state. In some embodiments, core quiesced 322 is determined by performing a bit wise AND operation for thread quiesce 328. If all threads are quiesced (e.g., all bits are set in threads quiesced), then the core is quiesced and in a suspended state.

In process 610, processor 320 waits for the system or zone to be quiesced based on the system/zone quiesced 336. If the system/zone quiesced 336 is not set (NO branch of process 610), then processor 320 waits for the system or zone to be quiesced. If the system/zone quiesced 336 is set (YES branch of process 610), then processor 320 waits for a command from system controller 310 to perform the operation requiring the quiesce request (process 612). System controller 310 determines a priority for the processors with pending quiesce request. If processor 320 does not have priority (NO branch of process 612), then processor 320 waits until system controller 310 determines that the processor has priority. If processor 320 has the highest priority of all processors (YES branch of process 612), then system controller 310 sends a command to processor 320 to perform the operations which required a quiesce request.

In process 614, processor 320 performs the operations for the highest priority thread with a pending quiesce request. For example, processor 320 selects the thread with the left most bit in system request 326 and gives the thread priority. If no bits are set for system quiesced 326, processor 320 selects the thread with the left most bit in zone request 324 and gives the thread priority. Once the highest priority thread has performed the operation requiring a quiesce request, processor resets the bits corresponding to the thread for both zone request 324 and system request 326 (process 616). In process 618, processor 320 determines if any threads have pending quiesce requests. If either zone request 324 or system request 326 have a bit set (YES branch of process 618), then a thread on processor 320 has a pending request. Processor 320 repeats processes 614 and 616 for the current thread with the highest priority. If no thread has a pending quiesce request (NO branch of process 618), then processor 320 sends a reset quiesce request to system controller 310 (process 620). Based on the type of quiesce (e.g., zone or system), processor 320 sends the corresponding reset quiesce request command. In process 622, processor 320 waits until the system or zone is no longer quiesced. If the system or zone is quiesced (YES branch of process 622), then processor 320 waits until the system or zone is no longer quiesced. If the system or zone is no longer quiesced (NO branch of process 622), then processor 320 resumes operations for all threads (process 624).

Figure 7:
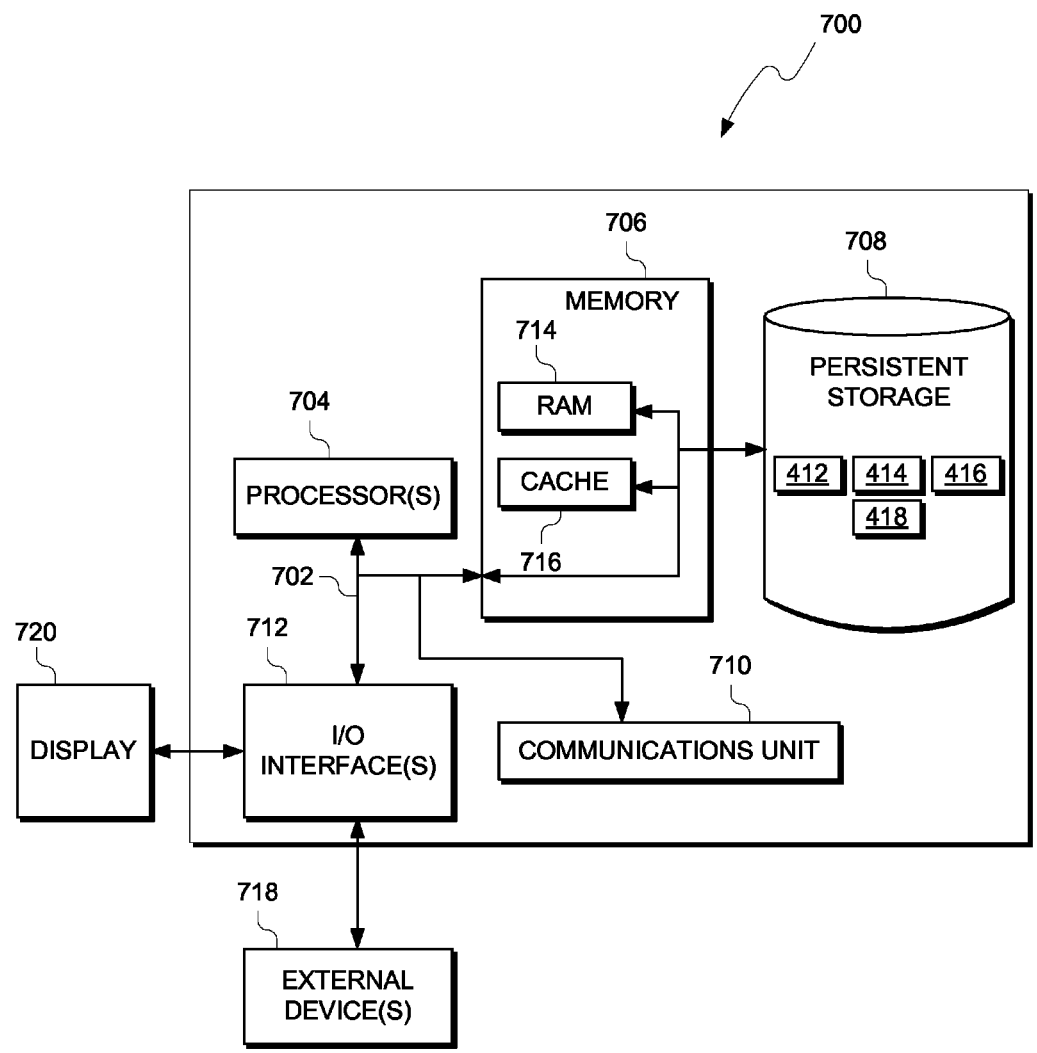
FIG. 7 depicts a block diagram of components of the computing device executing an emulated computing environment, in accordance with an exemplary embodiment of the present invention.

FIG. 7 depicts a block diagram, 700, of components of computing device 410, in accordance with an exemplary embodiment of the present invention. It should be appreciated that FIG. 7 provides only an illustration of one implementation and does not imply any limitations with regard to the environments in which different embodiments may be implemented. Many modifications to the depicted environment may be made.

Computing device 410 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

System control program 412, system quiesce data 414, core control program 416 and core quiesce data 418 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 420. In these examples, communications unit 710 includes one or more network interface cards. Communications unit 710 may provide communications through the use of either or both physical and wireless communications links. System control program 412, system quiesce data 414, core control program 416 and core quiesce data 418 may be downloaded to persistent storage 708 through communications unit 710.

I/O interface(s) 712 allows for input and output of data with other devices that may be connected to computing device 710. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., system control program 412, system quiesce data 416, core control program 416 and core quiesced data 418, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for performing a quiesce operation in a multithread environment, the method comprising:
receiving, by a system controller, a quiesce request from a thread executing on an initiating processor of a plurality of processors in a computing system, wherein the quiesce request comprises a zone quiesce request;

sending, by the system controller, a quiesce interrupt operation to one or more processors of a zone associated with the zone quiesce request;

identifying, by the system controller, that the one or more processors of the zone have reached respective interruptible points of execution for the one or more processors, wherein the one or more processors indicate the respective interruptible points of execution by setting a respective one or more bits corresponding with one or more threads executing on the one or more processors of the zone;

in response to a determination that the one or more processors of the zone have reached respective interruptible points of execution, program instructions to determine, by the system controller, a respective priority for the one or more processors of the zone with pending quiesce requests; and program instructions to send, by the system controller, one or more commands to a quiesced processor of the one or more processors with pending quiesce requests based on the respective priority for the one or more processors of the zone with pending quiesce requests, wherein the one or more commands instruct the quiesced processor to perform one or more instructions requiring a quiesced state of the zone.

2. The method of claim 1, wherein the zone quiesce request is for all processors connected to the system controller.

3. The method of claim 1, wherein the zone quiesce request is for a subset of all processors connected to the system controller.

4. The method of claim 1, wherein the one or more processors of the zone are quiesced until the quiesced processor performs the one or more instructions requiring a quiesced state of the zone.

* * * * *